(12) United States Patent
Minoura et al.

(10) Patent No.: US 7,999,889 B2
(45) Date of Patent: Aug. 16, 2011

(54) SCATTERING-TYPE DISPLAY INCLUDING DIFFRACTION REDUCING LAYER

(75) Inventors: Kiyoshi Minoura, Nara (JP); Sayuri Fujiwara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 178 days.

(21) Appl. No.: 12/294,575

(22) PCT Filed: Mar. 14, 2007

(86) PCT No.: PCT/JP2007/055109
§ 371 (c)(1),
(2), (4) Date: Sep. 25, 2008

(87) PCT Pub. No.: WO2007/111137
PCT Pub. Date: Oct. 4, 2007

(65) Prior Publication Data
US 2009/0135320 A1    May 28, 2009

(30) Foreign Application Priority Data
Mar. 29, 2006  (JP) .................................. 2006-091964

(51) Int. Cl.
*G02F 1/1333*    (2006.01)
(52) U.S. Cl. ....................................................... 349/110
(58) Field of Classification Search .................. None
See application file for complete search history.

(56) References Cited

U.S. PATENT DOCUMENTS

| | | | |
|---|---|---|---|
| 5,615,028 A * | 3/1997 | Ishiguro et al. ................. | 349/42 |
| 5,673,127 A * | 9/1997 | Takahara et al. ............... | 349/140 |
| 6,005,651 A | 12/1999 | Takahara et al. | |
| 6,166,856 A | 12/2000 | Araki et al. | |
| 6,977,705 B1 | 12/2005 | Chiang et al. | |
| 2001/0040717 A1 | 11/2001 | Minoura et al. | |
| 2002/0005920 A1 * | 1/2002 | Sakamoto et al. .............. | 349/44 |
| 2003/0038916 A1 * | 2/2003 | Nakano et al. ................. | 349/158 |
| 2003/0053015 A1 | 3/2003 | Minoura et al. | |
| 2004/0114111 A1 | 6/2004 | Watanabe | |
| 2004/0125263 A1 * | 7/2004 | Lee ................................. | 349/43 |

FOREIGN PATENT DOCUMENTS

JP    57-132116    8/1982
(Continued)

OTHER PUBLICATIONS

International Search Report for PCT/JP2007/055109, mailed Apr. 17, 2007.
(Continued)

*Primary Examiner* — Mike Stahl
(74) *Attorney, Agent, or Firm* — Nixon & Vanderhye P.C.

(57) ABSTRACT

A display device including: a pair of substrates 10 and 12 placed so as to oppose each other; a plurality of pixel electrodes 16 formed on one 12 of the pair of substrates; a counter electrode 18 formed on the other 10 of the pair of substrates; and a modulation layer 1 provided between the plurality of pixel electrodes 16 and the counter electrode 18, the modulation layer 1 being capable of switching states between a transmitting state in which light is transmitted and a scattering state in which light is scattered. The display device further includes: a plurality of switching elements 13 formed on the one substrate 12 and electrically connected respectively to corresponding pixel electrodes 16; a plurality of wiring lines 14 disposed on the one substrate 12 and at intervals 22 from the plurality of pixel electrodes 16; and a diffraction preventing layer 30 disposed in the intervals 22 between the wiring lines 14 and the pixel electrodes 16.

10 Claims, 9 Drawing Sheets

FOREIGN PATENT DOCUMENTS

| | | |
|---|---|---|
| JP | 05-034664 | 2/1993 |
| JP | 11-064831 | 3/1999 |
| JP | 2006-039097 | 2/2006 |
| WO | 2008/053774 | 5/2008 |

OTHER PUBLICATIONS

English translation of the International Preliminary Report on Patentability mailed Oct. 30, 2008 in corresponding PCT Application No. PCT/JP2007/055109.

* cited by examiner

SCATTERING-TYPE DISPLAY INCLUDING DIFFRACTION REDUCING LAYER

This application is the U.S. national phase of International Application No. PCT/JP2007/055109, filed 14 Mar. 2007 which designated the U.S. and claims priority to Japanese Application No. 2006-091964, filed 29 Mar. 2006, the entire contents of each of which are hereby incorporated by reference.

TECHNICAL FIELD

The present invention relates to a display device.

BACKGROUND ART

Many liquid crystal display devices which are currently in practical use utilize polarized light. Such display devices have a problem in that polarizing plates which are used for generating polarized light lower the efficiency of light utilization.

In order to obtain an enhanced displaying performance by improving the efficiency of light utilization of a liquid crystal display device, it has been proposed to utilize a scattering display mode by using scattering-type liquid crystal. In the scattering display mode, a voltage which is applied across a liquid crystal layer causes the liquid crystal layer to switch between a transmitting state in which light is transmitted and a scattering state in which light is scattered, and displaying is performed by utilizing this. A display device which utilizes such a display mode does not need polarizing plates, so that its efficiency of light utilization can be enhanced. There is also an advantage in that there is little viewing angle dependence, and so on.

As an example of a display device utilizing the scattering display mode, Patent Document 1 discloses a retroreflection display device in which a retroreflection plate is disposed at the rear face side of a liquid crystal layer (i.e., the opposite side of the liquid crystal layer from the viewer), for example.

Figure 1:
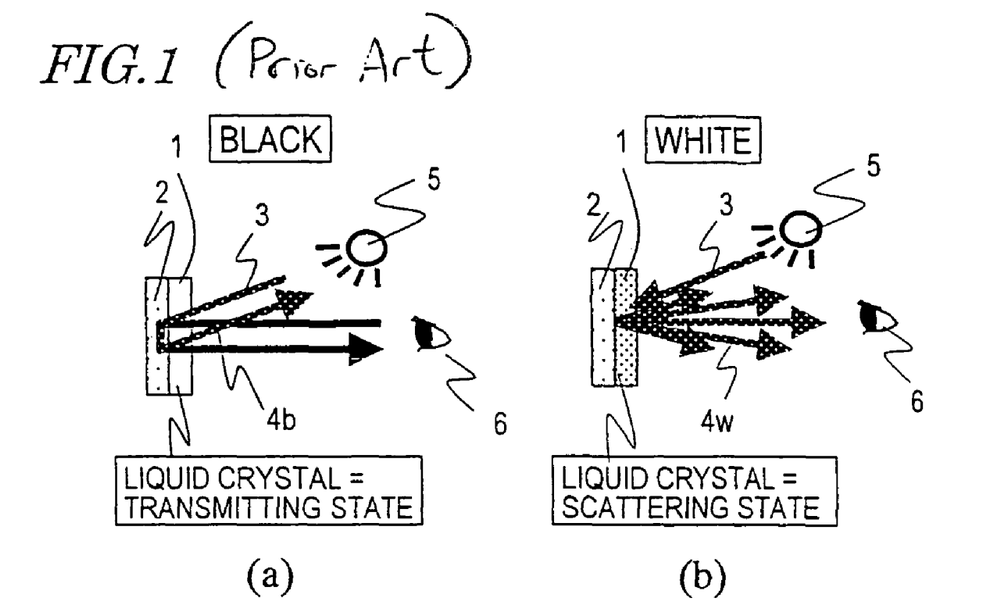

Hereinafter, with reference to the drawings, the operation principles of a retroreflection display device will be described. FIGS. 1(*a*) and (*b*) are diagrams for explaining a black displaying state and a white displaying state of a display device.

As shown in FIG. 1(*a*), while the liquid crystal layer 1 is controlled to be in a transmitting state, incident light 3 from a light source 5 which is external to the display device travels through the liquid crystal layer 1, and thereafter is reflected by a retroreflection plate 2 in the direction in which the light has entered (reflected light 4*b*). Therefore, the light from the light source 5 does not reach the viewer 6. At this time, it is an image of the eye(s) of the viewer himself or herself that reaches the viewer 6 from the display device, whereby a "black" displaying state is obtained.

On the other hand, as shown in FIG. 1(*b*), while the liquid crystal layer 1 is controlled to be in a scattering state, the incident light 3 from the light source 5 is scattered in the liquid crystal layer 1. In the case where the liquid crystal layer 1 is a forward scattering-type liquid crystal layer, the scattered light is reflected by the retroreflection plate 2, furthermore travels through the liquid crystal layer 1 in a scattering state, and goes out in the viewing direction (reflected light 4*w*). Since the retroreflectivity of the retroreflection plate 2 is counteracted by the scattering in the liquid crystal layer 1, the incident light 3 does not go back in its incident direction. As a result, a "white" displaying state is obtained.

By performing displaying based on such operation principles, it is possible to realize white-black displaying without using polarizers. Therefore, a highly bright reflection liquid crystal display device can be realized, free from the influence of lowering of the efficiency of light utilization due to use of polarizers.

Patent Document 2 filed by the Applicant proposes, as the retroreflection plate 2, using a corner cube array in which corner cubes are placed in a two-dimensional array, each corner cube being composed of three faces which are orthogonal to one another. Since the corner cube array has a high retroreflectance, the amount of unnecessary light that reaches the viewer 6 in a black displaying state is reduced, whereby the displaying contrast ratio can be further improved.

Next, with reference to the drawings, the specific construction of a retroreflection liquid crystal display device will be described. As an example, a display device will be described which is constructed so that a retroreflection plate is disposed on the outer side of a rear substrate (i.e., the opposite side of the rear substrate from the liquid crystal layer). The construction of such a display device is disclosed in Patent Document 3, for example. Note that, in the present specification, between two opposing substrates, the substrate which is located on the viewer's side will be referred to as the "front substrate", whereas the substrate located on the opposite side from the viewer will be referred to as the "rear substrate".

Figure 2:
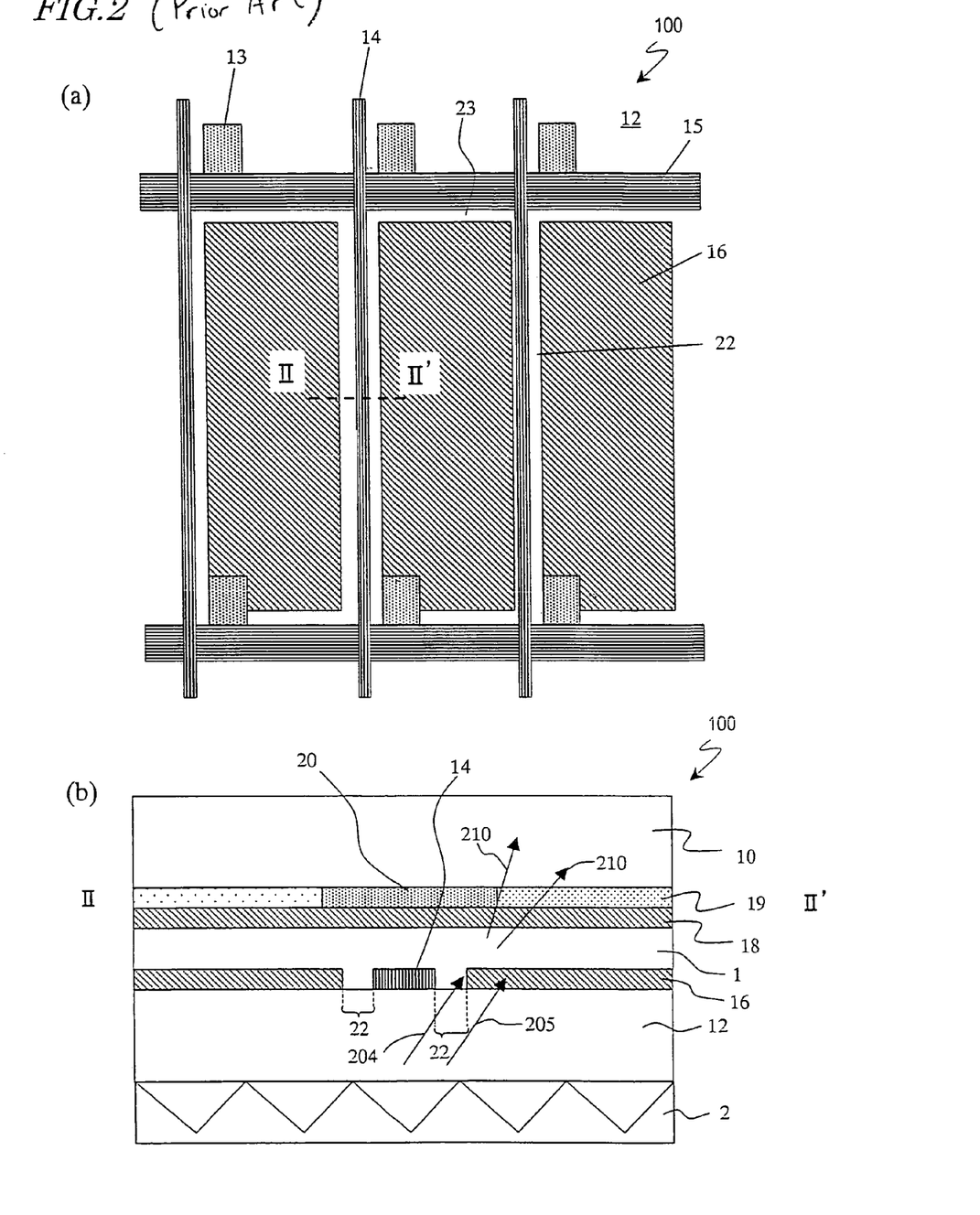

FIG. 2(*a*) is a plan view showing wiring lines and electrodes being present on the rear substrate of a retroreflection liquid crystal display device. FIG. 2(*b*) is a diagram for describing the construction of a retroreflection liquid crystal display device, which is a schematic cross-sectional view of the retroreflection liquid crystal display device along line II-II' in the plan view of FIG. 2(*a*).

The display device 100 includes a front substrate 10 and a rear substrate 12 disposed so as to oppose the front substrate 10. Between the substrates 10 and 12, a scattering-type liquid crystal layer 1 which is capable of taking a scattering state or a transmitting state is provided.

On a face of the rear substrate 12 closer to the liquid crystal layer 1, a plurality of thin film transistors (TFTs: Thin Film Transistors) 13 functioning as switching elements, a plurality of pixel electrodes 16, source lines 14 which are connected to the pixel electrodes 16 via the TFTs, gate lines 15 for selectively driving the thin film transistors 13, and the like are formed. The pixel electrodes 16 are formed by using an electrically conductive material which transmits light, e.g., ITO (indium tin oxide). As shown in FIG. 2(*b*), the pixel electrodes 16 are disposed so as to be spaced apart, thus defining pixels, each of which is one unit of image displaying. On the other hand, generally speaking, wiring lines such as the source lines 14 and the gate lines 15 are formed by using a metal material which shields light, e.g., tantalum. Although not shown, the wiring lines 14 and 15 are respectively connected to a source driver and a gate driver in a driving circuit which is provided on the rear substrate 12. The wiring lines 14 and 15 are disposed at predetermined intervals 22 and 23 from each pixel electrode 16 in order to ensure that the parasitic capacitances between themselves and the pixel electrode 16 will not be too large. The intervals 22 and 23 between each pixel electrode 16 and the wiring lines 14 and 15 are e.g. about 3 μm. On the opposite face of the rear substrate 12 from the liquid crystal layer 1, the retroreflection plate 2 is provided.

On the front substrate 10 a counter electrode 18 composed of color filters 19, a black matrix 20, and a transparent conductive film is provided. The color filters are transparent for the respective pixels. The black matrix is disposed between adjoining pixels and in the neighborhood of the display region, as necessary, so as to shade the wiring lines 14 and 15 and the thin film transistor 13.

In the display device 100, by controlling the voltage which is applied between the counter electrode 18 and the pixel electrode 16, it becomes possible to switch the liquid crystal layer 1 between a scattering state and a transmitting state.

[Patent Document 1] Japanese Laid-Open Patent Publication No. 2002-107519

[Patent Document 2] Japanese Laid-Open Patent Publication No. 2003-066211

[Patent Document 3] Japanese Laid-Open Patent Publication No. 11-15415

DISCLOSURE OF INVENTION

Problems to be Solved by the Invention

Through a study of the inventors it has been found that, in a display device of a scattering display mode as exemplified in FIGS. 2(*a*) and (*b*), the refractive index in the intervals 22 and 23 between each pixel electrode 16 and the wiring lines 14 and 15 is different from the refractive index in the pixel electrodes 16 and therefore diffracted light may occur to deteriorate the displaying characteristics. This problem will be specifically described below, with reference to the drawings.

Figure 3:
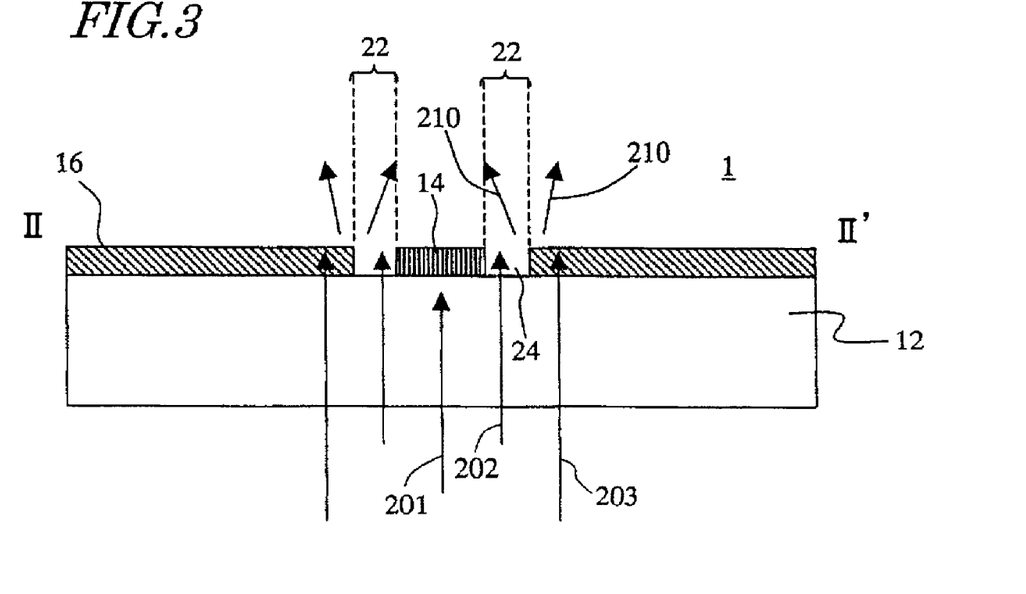
FIG. 3 A diagram for explaining the behavior of light entering a liquid crystal layer from the rear substrate side, which is a II-III cross-sectional view in the plan view of FIG. 2(a).

FIG. 3 is a diagram for explaining the behavior of light entering the liquid crystal layer from the rear substrate side, which is a II-II' cross-sectional view in the plan view of FIG. 2(*a*). Herein, the behavior of light which perpendicularly enters the front face of the rear substrate 12, in a state where the retroreflection plate 2 is not provided on the rear face of the rear substrate 12, will be discussed.

In the light which is transmitted through the rear substrate (e.g., a glass substrate) 12, a ray 201 which strikes a wiring line 14 is shielded by the wiring line 14, but a ray 203 striking a pixel electrode 16 travels through the pixel electrode 16, whereas a ray 202 striking an interval 22 between the pixel electrode 16 and the wiring line 14 travels through a medium 24 which is provided between the pixel electrode 16 and the wiring line 14. The refractive index of the pixel electrode 16 is about 2.0. The medium 24 may be scattering-type liquid crystal (refractive index in an ON state: about 1.5), or an alignment film (e.g., polyimide with a refractive index: about 1.6) formed on the front face of the rear substrate 12.

Thus, since adjoining pixel electrodes 16 and the medium 24 disposed therebetween have different refractive indices, the ray 203 traveling through each pixel electrode 16 and the ray 202 traveling through the medium 24 follow paths with different optical path lengths, thus generating diffracted light 210. The resultant diffracted light 210 enters the liquid crystal layer 1 in the form of light in various directions. As used herein, "diffracted light" not only refers to light occurring due to a structure in which objects of different refractive indices are regularly arranged (a diffraction grating), but also encompasses scattered light which, in the case where the arrangement of objects of different refractive indices is not regular, is generated from the respective objects serving as secondary light sources. Furthermore, it encompasses not only the case where such a structure is composed of a plurality of pieces, but also the case where it is disposed as a singular piece, e.g., a single slit.

In the display device 100 illustrated in FIGS. 2(*a*) and (*b*), when the aforementioned diffracted light 210 occurs, the quality of black displaying may be deteriorated in a black displaying state (i.e., a state where the liquid crystal layer 1 is transparent). This will be described referring back to FIG. 2(*b*).

In the display device 100, light is shielded between adjoining pixel electrodes 16 by the black matrix 20 on the front substrate 10. Therefore, light entering into the intervals 22 from the front substrate 10 is reduced, whereby generation of diffracted light 210 is suppressed. Moreover, even if diffracted light 210 is generated, a portion thereof is absorbed by the black matrix 20, so that the influence that the diffracted light 210 exerts on displaying is reduced. However, the diffracted light 210 which is generated from the ray 204 traveling through the interval 22 in an oblique direction and the ray 205 traveling through the pixel electrode 16 reach the viewer via the color filters 19, thus becoming leaking light in a black displaying state, whereby the displaying contrast is lowered.

In order to prevent problems caused by such diffracted light 210, it may be conceivable to increase the area of the black matrix 20 so that all diffracted light 210 will be restrained from going out toward the viewer's side. However, enlarging the black matrix 20 will result in a low aperture ratio, and thus a lower efficiency of light utilization.

The present invention has been made in view of the above circumstances, and an objective thereof is to, in a display device which utilizes the scattering display mode, reduce occurrence of diffracted light and improve the displaying contrast.

Means for Solving the Problems

A display device according to the present invention is a display device comprising: a pair of substrates placed so as oppose each other; a plurality of pixel electrodes formed on one of the pair of substrates; a counter electrode formed on the other of the pair of substrates; and a modulation layer provided between the plurality of pixel electrodes and the counter electrode, the modulation layer being capable of switching states between a transmitting state in which light is transmitted and a scattering state in which light is scattered, the display device further comprising: a plurality of switching elements formed on the one substrate and electrically connected respectively to corresponding pixel electrodes; a plurality of wiring lines disposed on the one substrate and at intervals from the plurality of pixel electrodes; and a diffraction preventing layer disposed in the intervals between the wiring lines and the pixel electrodes.

In a preferred embodiment, the diffraction preventing layer absorbs light entering the interval.

In a preferred embodiment, the diffraction preventing layer is composed of a material having a refractive index within ±10% of a refractive index of a material of the pixel electrodes.

The diffraction preventing layer may be composed of a material having a refractive index of no less than 1.8 and no more than 2.2.

The display device may further comprise a reflective layer disposed on an opposite side of the one substrate from the modulation layer.

The reflective layer may have retroreflection characteristics.

In a preferred embodiment, the one substrate has a thickness which is smaller than a thickness of the other substrate.

Effects of the Invention

According to the present invention, in a display device which utilizes the scattering display mode, deteriorations in the black displaying characteristics due to diffracted light can be suppressed while conserving the efficiency of light utilization, and therefore the displaying contrast can be improved.

BRIEF DESCRIPTION OF DRAWINGS

FIGS. 1 (a) and (b) are diagrams describing the operation principles of a retroreflection liquid crystal display device.

FIGS. 2 (a) and (b) are diagrams for explaining the construction of a conventional retroreflection liquid crystal display device, where: (a) is a plan view showing wiring lines and electrodes being present on the rear substrate of a retroreflection liquid crystal display device; and (b) is a schematic cross-sectional view of the retroreflection liquid crystal display device along line II-III in (a).

FIGS. 4 (a) and (b) are diagrams for explaining the construction of a retroreflection liquid crystal display device according to an embodiment of the present invention, where: (a) is a plan view showing wiring lines and electrodes being present on the rear substrate of a retroreflection liquid crystal display device; and (b) is a schematic cross-sectional view of the retroreflection liquid crystal display device along line IV-IV' in (a).

FIGS. 7 (a) and (b) are schematic cross-sectional views showing retroreflection display devices with rear substrates of different thicknesses.

FIGS. 10 (a) and (b) are graphs showing a relationship between a transmission intensity T and an light receiving angle θ in a black displaying state.

DESCRIPTION OF THE REFERENCE NUMERALS 1 liquid crystal layer
2 retroreflection plate
10 front substrate
12 rear substrate
13 thin film transistor
14 source line
15 gate line
16 pixel electrode
18 counter electrode
19 color filter
20 black matrix
22 interval between pixel electrode and source electrode
23 interval between pixel electrode and gate electrode
30 light absorbing layer
32 high-refractive index layer
100, 200, 300 display device

BEST MODE FOR CARRYING OUT THE INVENTION

The present invention is characterized in that, in a display device which utilizes the scattering display mode, diffraction preventing layers are disposed in the intervals between pixel electrodes and wiring lines on a rear substrate. In the present specification, a "diffraction preventing layer" refers to a layer which suppresses occurrence of diffracted light due to light traveling through a pixel electrode from the rear substrate side and light traveling between adjoining pixel electrodes, i.e., through an interval between the pixel electrode and a wiring line (source and/or gate line).

Such diffraction preventing layers may be light absorbing layers which absorb light entering the aforementioned intervals from the rear substrate side. As a result, only the light traveling through the pixel electrodes from the rear substrate side enters the liquid crystal layer, so that occurrence of diffracted light is suppressed, whereby deteriorations in the displaying characteristics are minimized. Alternatively, as the diffraction preventing layers, high-refractive index layers may be formed by using a material which has about the same refractive index as that of the material of the pixel electrodes. When high-refractive index layers are formed in the intervals between the pixel electrodes and the wiring lines, the paths of the light traveling through the pixel electrode and the light traveling between adjoining pixel electrodes have a substantially equal optical path length, so that occurrence of diffracted light can be reduced. Note that the diffraction preventing layers according to the present invention may be formed in at least a part of an interval between a pixel electrode and a wiring line on the rear substrates.

Hereinafter, embodiments of the display device according to the present invention will be described with reference to the drawings.

Embodiment 1

The display device of Embodiment 1 is a retroreflection liquid crystal display device in which scattering-type liquid crystal is used.

FIG. 4(a) is a plan view showing wiring lines and electrodes being present on a rear substrate in the display device of the present embodiment. FIG. 4(b) is a diagram for describing the display device of the present embodiment, which is a schematic cross-sectional view of the retroreflection liquid crystal display device along line IV-IV' in the plan view of FIG. 4(a).

Except that light absorbing layers functioning as diffraction preventing layers are formed, the display device 200 shown in FIGS. 4(a) and (b) has a similar construction to that of the display device 100 described above with reference to FIGS. 2(a) and (b). For simplicity, like reference numerals are attached to constituent elements similar to those of the display device 100, and the descriptions thereof are omitted.

On a rear substrate 12 of the display device 200, a plurality of pixel electrodes (size: e.g. 60 μm×180 μm) 16 are disposed at intervals (width: e.g. 3 μm) 22, 23 from source lines 14 and gate lines 15, and light absorbing layers 30 are formed in the intervals 22 between the pixel electrodes 16 and the source lines 14. Each light absorbing layer 30 according to the present embodiment is disposed so as to cover ends of adjoining pixel electrodes 16 and a source line 14. As the material of the light absorbing layers 30, an insulative material which absorbs light may be used, e.g., a black resin material. Preferably, the material of the light absorbing layers 30 is photosensitive. As a result, the patterning step for forming the light absorbing layers 30 can be simplified.

In accordance with the display device 200, in the reflected light having been reflected from the retroreflection plate 2, a ray 402 which enters each interval 22 on the rear substrate 12 is absorbed by a light absorbing layer 30, and thus does not enter the liquid crystal layer 1. Therefore, only a ray 403 of reflected light which has traveled through the pixel electrode 16 enters the liquid crystal layer 1 and is available for displaying. Thus, according to the present embodiment, diffracted light 210 as shown in FIG. 3 does not occur, and therefore deteriorations in the displaying characteristics due to diffracted light are suppressed.

In the present embodiment, the light absorbing layers 30 are formed by the following method. First, on the rear substrate 12 having the pixel electrodes 16 and the source lines 14 formed thereon, a black resin material is applied by spin coating technique, thus forming a black resin film. Next, the black resin film is patterned by photolithography, whereby the light absorbing layers 30 are obtained. Using an application type material as the material of the light absorbing layers 30 is advantageous because it allows the groove-like intervals 22 having a width of about 3 μm to be embedded with the light absorbing layers 30 with more certainty. Note that the method for forming the light absorbing layers 30 is not limited to the above method.

Figure 4:
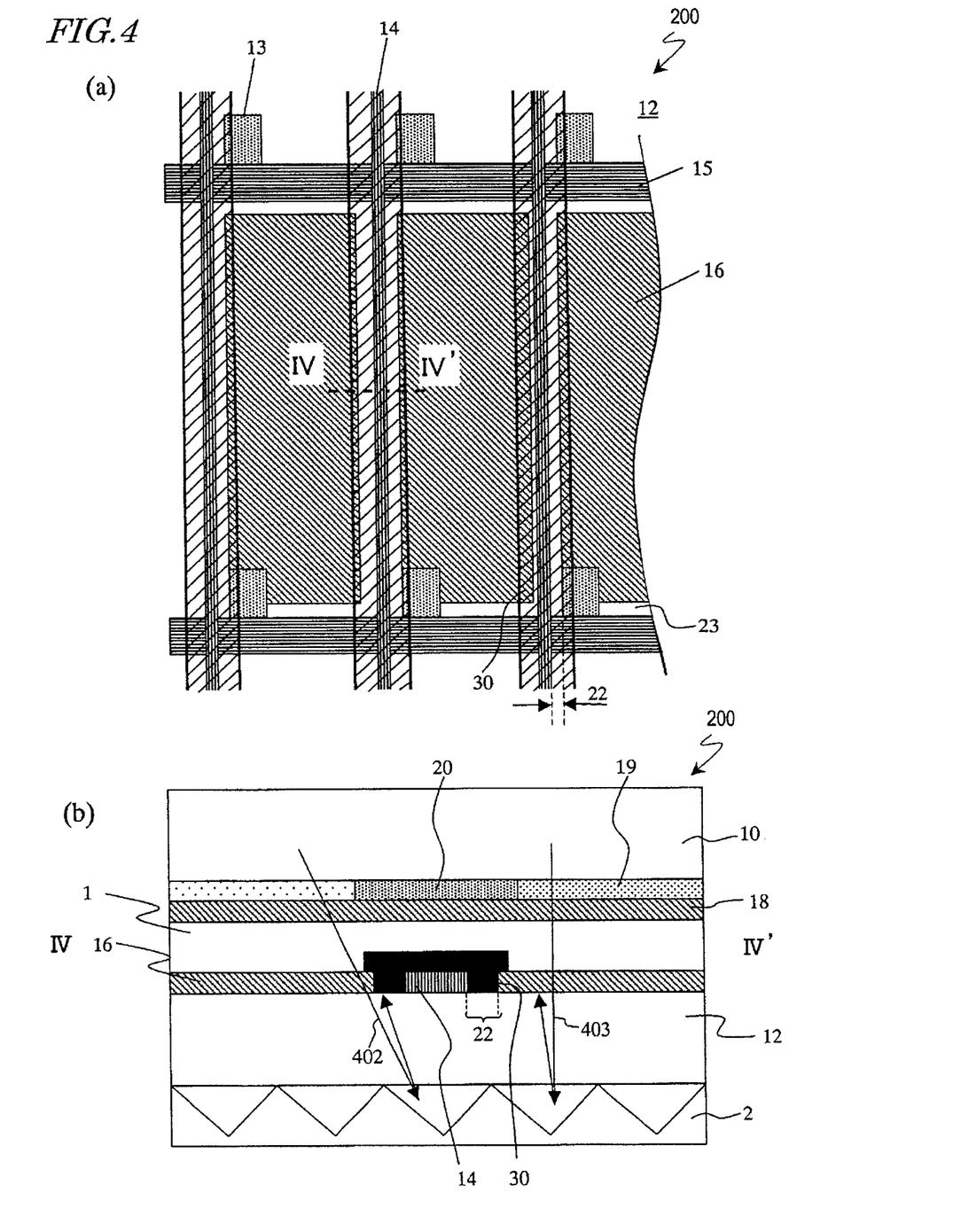

The positioning and shape of the light absorbing layers 30 is not limited to the positioning and shape as shown. Since the light absorbing layers 30 only need to be able to absorb the light which is transmitted through the rear substrate 12 and which enters the intervals 22 between the pixel electrodes 16 and the source lines 14, the light absorbing layers 30 only need to be disposed in at least the aforementioned intervals 22, and do no need to cover the ends of the source lines 14 as shown in FIG. 4(*b*). Moreover, they may cover not only the aforementioned intervals 22 but also thin film transistors 13 which are disposed for to the respective pixels. There is no particular limitation as to the thickness of the light absorbing layers 30, which may be smaller than the thickness of the pixel electrodes 16 or the source lines 14. Note that, in order to prevent a decrease in the aperture ratio due to the light absorbing layers 30, the light absorbing layers 30 are preferably formed within a region that is shaded by a black matrix 20 on the front substrate 10.

In the present embodiment, the light absorbing layers 30 are provided for all of the plurality of intervals 22 on the rear substrate 12, as shown in FIG. 4(*a*). However, the light absorbing layers 30 may be provided for only some of the intervals 22, or for a part of each interval 22. Instead of the intervals 22 or in addition to the intervals 22, the light absorbing layers 30 may also be provided in the intervals 23 between the pixel electrodes 16 and the gate lines 15. Note that there is no particular limitation as to the width of the intervals 22 and intervals 23 constituting the light absorbing layers 30, it is preferably no less than 1 μm and no more than 8 μm.

The liquid crystal layer 1 in the present embodiment may be any layer that is capable of switching between a transmitting state in which light entering the liquid crystal layer 1 is allowed to pass through while maintaining its direction of travel (which also encompasses the case where the incident light passes through while being refracted) and a scattering state providing a scattering action of changing the direction of travel of the light. For example, the liquid crystal layer 1 may be composed of nematic-cholesteric phase transition type liquid crystal, polymer-dispersed type liquid crystal having a holographic function or a diffraction function, or light scattering-type liquid crystal such as liquid crystal gel.

Preferably, polymer-dispersed type liquid crystal is used as scattering-type liquid crystal. Polymer-dispersed type liquid crystal may be obtained by, for example, allowing a mixture of a low-molecular-weight liquid crystal composition and an unpolymerized prepolymer to be mixed in a compatible manner, and after disposing it between the front substrate 10 and the rear substrate 12 on which electrodes and the like are formed, polymerizing the prepolymer. Although there is no particular limitation as to the type of prepolymer, a UV-curing prepolymer is preferably used. When a UV-curing prepolymer is used, there is no need to heat the aforementioned mixture when conducting polymerization, thus preventing unfavorable influences on the other members due to heat.

In the present embodiment, a mixture of a UV-curing prepolymer which exhibits mesomorpnism and a liquid crystal composition (by Merck Ltd.: TL213, Δn=0.238)(prepolymer liquid crystal mixture) is photocured through light irradiation with an activation beam such as ultraviolet, thus forming polymer-dispersed type liquid crystal. As the prepolymer liquid crystal mixture, for example, it is possible to use a prepolymer liquid crystal mixture which is obtained by mixing a UV-curing material and liquid crystal at a ratio by weight of 20:80, and adding a small amount of polymerization initiator (by Ciba-Geigy Corporation: Irgacure 651) thereto, and which shows a nematic liquid crystal phase at room temperature. Thus, the aforementioned polymer-dispersed type liquid crystal is formed by utilizing ultraviolet irradiation, and does not require a heat treatment. This reduces the damage on the other members formed on the front substrate 10 and the rear substrate 12 that may be exerted by forming the liquid crystal layer 1

The retroreflection plate 2 in the present embodiment may be any reflection plate that has retroreflection characteristics, but is preferably a corner cube array, and more preferably a cubic corner cube array, which particularly excels in retroreflection characteristics among other corner cube arrays. A cubic corner cube array is structured so that corner cubes are placed in a two-dimensional array, each corner cube being composed of three generally square faces which are orthogonal to one another, and can be formed by using a method which is disclosed in Japanese Laid-Open Patent Publication No. 2003-66211, etc. filed by the Applicant, for example. The entire disclosure of Japanese Laid-Open Patent Publication No. 2003-66211 is incorporated in the present specification by reference. The pitch at which the cubic corner cubes are arrayed may be no less than 3 μm and no more than 30 μm, for example.

Embodiment 2

The display device of Embodiment 2 is a retroreflection liquid crystal display device in which scattering-type liquid crystal is used.

Figure 5:
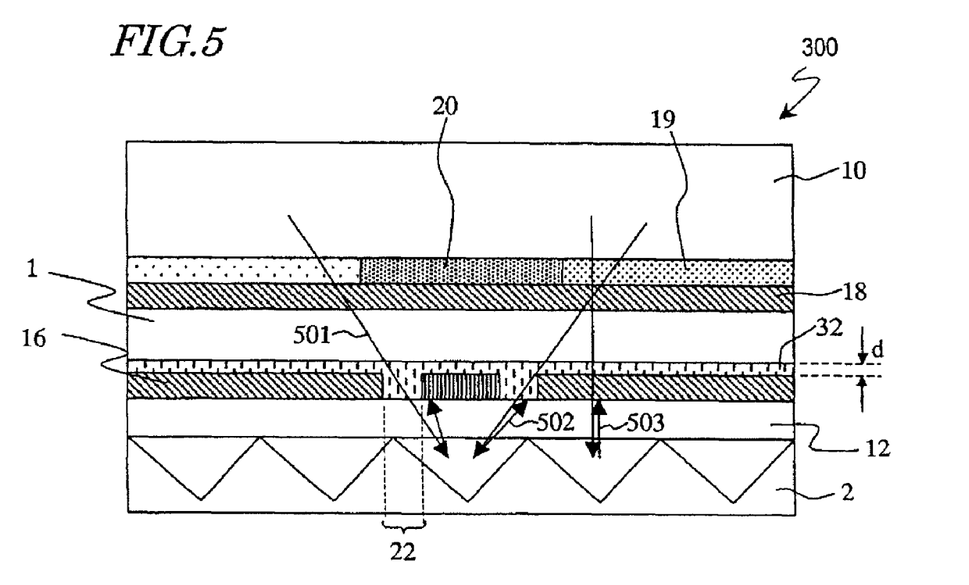
FIG. 5 A schematic cross-sectional view showing the construction of a retroreflection liquid crystal display device according to another embodiment of the present invention.

FIG. 5 is a schematic cross-sectional view for explaining the display device of the present embodiment. The rear substrate in the display device of the present embodiment is structured so that a transparent high-refractive index layer is formed on a rear substrate as shown in FIG. 2(*a*); however, its plan view is omitted herein.

A display device 300 shown in FIG. 5 has a similar construction to that of the display device 200 described above with reference to FIGS. 4(*a*) and (*b*), except that a high-refractive index layer 32 is formed as a diffraction preventing layer instead of light absorbing layers 30, and that a rear substrate 12 is thinner than a front substrate 10. For simplicity, like reference numerals are attached to constituent elements similar to those of the display device 200, and the descriptions thereof are omitted.

On the rear substrate 12 of the display device 300, a plurality of pixel electrodes (size: e.g. 60 μm×180 μm) 16 are disposed at intervals (width: 3 μm) 22, 23 from source lines 14 and gate lines 15, and a transparent high-refractive index layer (thickness d: e.g. 0.2 μm) 32 is formed thereupon. The high-refractive index layer 32 buries the intervals 22 and 23 between the pixel electrodes 16 and the wiring lines 14 and 15, and also provide planarization over the protrusions and depressions due to the pixel electrodes 16, the wiring lines 14 and 15, TFTs, and the like on the rear substrate 12.

The high-refractive index layer 32 is formed by using a material which has about the same refractive index as that of the material of the pixel electrodes 16. In the present embodiment, ITO (refractive index: about 2.0) is used as the material of the pixel electrode 16, and a resin material containing titanium dioxide microparticles (refractive index: about 2.0) is used as the material of the high-refractive index layer 32. Although the material of the high-refractive index layer 32 is not limited to the above material, it is preferable to use a transparent insulative material having a refractive index which is within ±10% of the refractive index of the material composing the pixel electrode 16. As for the material of the pixel electrode 16, too, a transparent electrically conductive material such as indium zinc oxide (IZO, refractive index: 1.9 to 2.0), aluminum zinc oxide (AZO), or zinc oxide (ZnO) may be used, other than ITO (refractive index: 1.7 to 2.0). In the case where ITO is used, it is preferable that the material of the high-refractive index layer 32 has a refractive index of no less than 1.8 and no more than 2.2.

In the display device 300, reflected light having been reflected from the retroreflection plate 2 is transmitted through the rear substrate 12 and enters the liquid crystal layer 1, and is available for displaying. At this time, a ray 502 of reflected light which enters an interval 22 between a pixel electrode 16 and a source line 14 travels through the high-refractive index layer 32. On the other hand, a ray 503 which enters a pixel electrode 16 travels through the pixel electrode 16 and the high-refractive index layer 32. Note that a ray 501 of reflected light which strikes a source line 14 is reflected by the source line 14, and does not enter the liquid crystal layer 1. Thus, according to the present embodiment, the rays 502 and 503 which are available for displaying both travel through layers having about the same refractive index. Therefore, the aforementioned diffracted light does not occur, and deteriorations in the displaying characteristics due to diffracted light entering the liquid crystal layer 1 in a transmitting state can be suppressed.

In the present embodiment, the high-refractive index layer 32 is formed by the following method. First, on a front face of the rear substrate 12 on which the thin film transistors 13, the wiring lines 14 and 15, and the pixel electrodes 16 are formed, an application liquid of a transparent resin material containing titanium dioxide microparticles (application liquid for high-refractive index film formation TI-44 by RASA Industries, LTD.) is applied by a spin coater, thus providing planarization over the protrusions and depressions on the rear substrate 12. Next, the resin material is baked at a temperature of 400° C., thus obtaining a high-refractive index layer 32 having a refractive index of about 2.0. Although the thickness d of the high-refractive index layer 32 is to be appropriately selected depending on the heights of the elements formed on the rear substrate 12 such as the pixel electrodes 16 and the wiring lines 14 and 15, it is no less than 0.1 µm and no more than 1 µm, for example. Note that, in the present specification, "the thickness d of the high-refractive index layer 32" refers to the thickness of any portion of the high-refractive index layer 32 that is located above a pixel electrode 16, as shown. In the present embodiment, the pixel electrodes 16 have a thickness of 0.15 µm and the wiring lines 14 and 15 have a thickness of 0.3 µm, and therefore it is preferable that the thickness d of the high-refractive index layer 32 is no less than 0.15 µm and no more than 0.3 µm.

Since the aforementioned resin material used in the present embodiment permits its refractive index to be adjusted in a range from 1.8 to 2.2 depending on the bake temperature, it can be suitably used even in the case where a transparent electrically conductive material other than ITO (e.g. IZO) is used as the material of the pixel electrode 16.

Using an application-type resin material to form the high-refractive index layer 32 is preferable because, as in the above method, it is possible to provide planarization over the protrusions and depressions of the rear substrate 12. As used herein, to "provide planarization" does not require an ability to provide complete planarization over the protrusions and depressions of the rear substrate 12. A portion of the rear substrate 12 where source and gate lines 14 and 15 intersect (crossed portion) has a height of about 0.5 µm, for example. Moreover, a thin film transistor 13 usually has a thickness of about 1.0 µm. Therefore, depending on the thickness of the high-refractive index layer 32, it may not be possible to provide complete planarization over the level differences due to the aforementioned crossed portions and thin film transistors 13. However, even in the case of such partial failures to provide planarization, it is preferable if a total thickness of each pixel electrode 16 and the overlying high-refractive index layer 32 is substantially equal to the thickness of the high-refractive index layer 32 located in the intervals 22 and 23, because occurrence of diffracted light will be more effectively prevented.

Planarizing over the protrusions and depressions on the rear substrate 12 with the high-refractive index layer 32 provides the following advantage in addition to being able to suppress deteriorations in the displaying characteristics due to diffracted light.

For example, in the display device shown in FIGS. 2(a) and (b) the surface of the liquid crystal layer 1 facing the rear substrate has protrusions and depressions corresponding to the protrusions and depressions on the rear substrate 12. Therefore, even in a transmitting state (black displaying state), the protrusions and depressions on the surface of the liquid crystal layer 1 facing the rear substrate may scatter a portion of the light traveling through the liquid crystal layer 1, thus deteriorating the black displaying characteristics. On the other hand, the present embodiment provides planarization over the protrusions and depressions on the rear substrate 12, and therefore such deteriorations in the black displaying characteristics can be suppressed.

Figure 6:
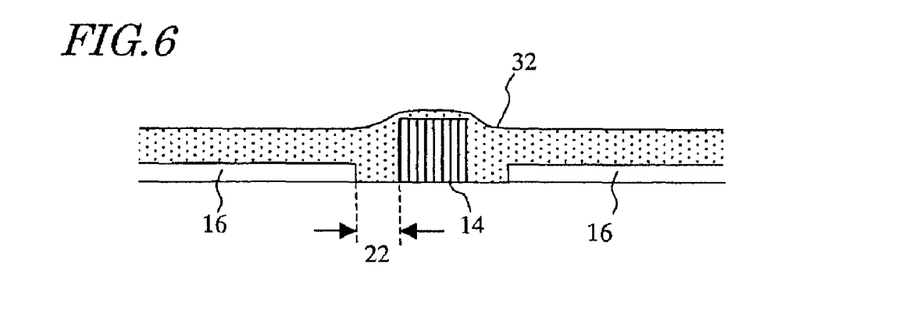
FIG. 6 A schematic cross-sectional view showing another construction for a high-refractive index layer according to an embodiment of the present invention.

Note that the high-refractive index layer 32 does not need to provide planarization over the protrusions and depressions of the rear substrate 12, as exemplified in FIG. 6. In this case, too, the differences in refractive index of the layers through which the reflected light reflected by the retroreflection plate 2 travels can be reduced, and the level differences of the protrusions and depressions on the rear substrate 12 can be reduced, thus alleviating the influences of diffracted light and the protrusions and depressions on the rear substrate 12 that are exerted on the displaying characteristics.

Moreover, in the case where the high-refractive index layer 32 does not provide planarization over the protrusions and depressions on the rear substrate 12, i.e., the total thickness of each pixel electrode 16 and the overlying high-refractive index layer 32 differs from the thickness of the high-refractive index layer 32 located in the intervals 22 and 23, the refractive indices of the materials Composing the pixel electrodes 16 and the high-refractive index layer 32 may be selected so that the ray 503 entering each pixel electrode 16 and the ray 502 entering the interval 22 or 23 have substantially the same optical path length. If the path difference between the ray 503 entering each pixel electrode 16 and the ray 502 entering the interval 22 or 23 is kept within ±10% as a result of appropriately selecting the thickness and refractive index of the high-refractive index layer 32, a high diffraction prevention effect will be obtained, which is preferable.

Thus, the high-refractive index layer 32 in the present embodiment only needs to ensure that the optical path length of the ray 502 which is transmitted through the rear substrate 12 and enters the interval 22 or 23 between a pixel electrode 16 and a source line 14 or a gate line 15 (respectively) and the optical path length of the ray 503 entering each pixel electrode 16 are substantially equal (e.g. within ±10%), and its construction is not limited to the construction shown. For example, a high-refractive index layer 32 having substantially the same thickness as that of the pixel electrodes 16 may be provided in the intervals 22 or the intervals 23, without even covering the pixel electrodes 16, the wiring lines 14 and 15, and the like. Furthermore, the method for forming the high-refractive index layer 32 is not limited to the above method; the high-refractive index layer 32 may be formed by depositing a material having a desired refractive index and subjecting it to patterning as necessary.

In the present embodiment, the rear substrate 12 is thinner than the front substrate (thickness: e.g. 700 μm) 10, and its thickness is 100 μm, for example. The below-described advantage will be obtained when the rear substrate 12 is thin.

Figure 7:
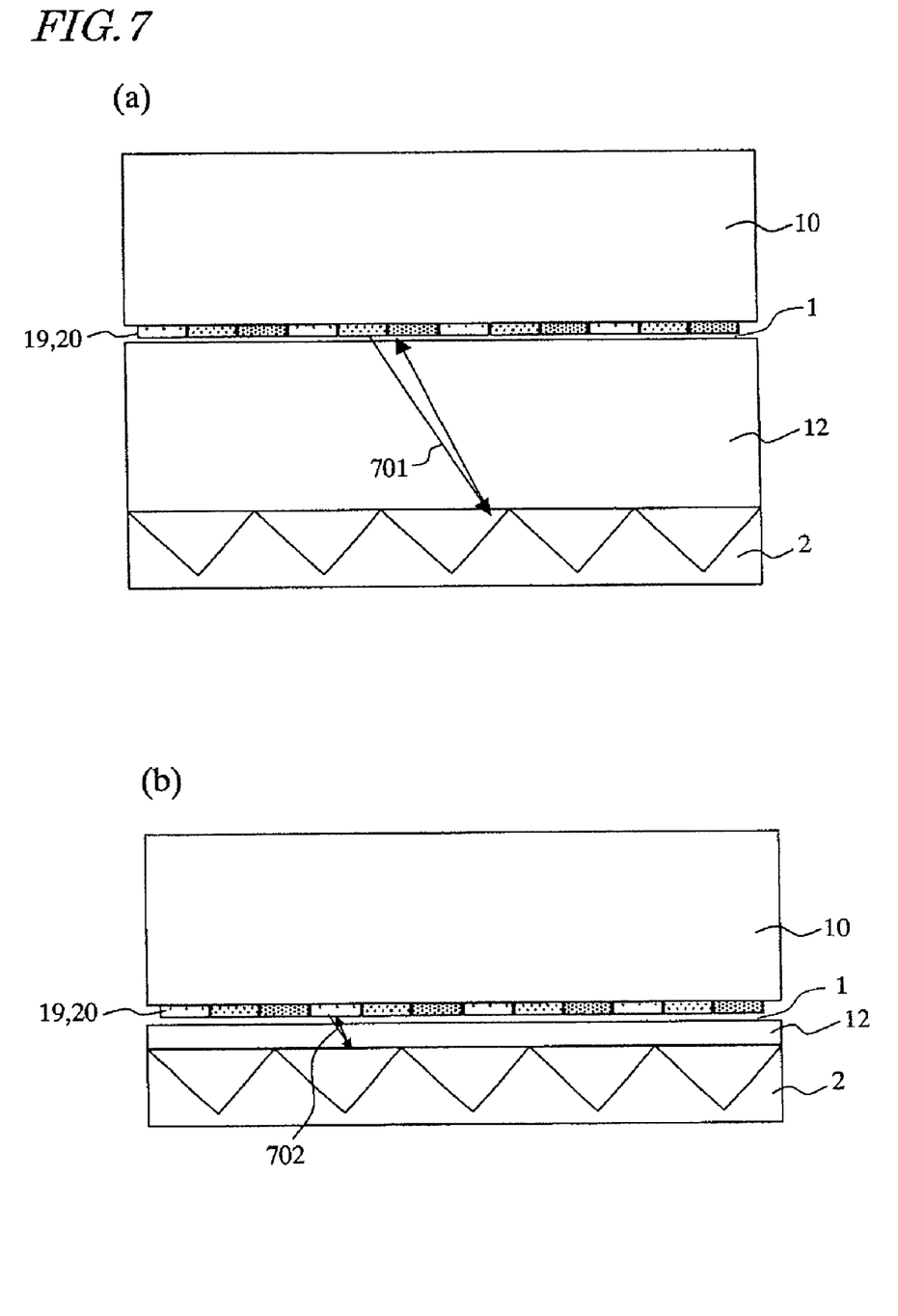

FIGS. 7(*a*) and (*b*) are schematic cross-sectional views showing, respectively, a display device including a rear substrate (thickness: 700 μm) 12 whose thickness is about the same as that of the front substrate 10, and a display device including a rear substrate (thickness: 100 μm) 12 which is thinner than the front substrate 10. For simplicity, like reference numerals are attached to constituent elements similar to those in FIG. 2, FIG. 4, and FIG. 5. Moreover, the high-refractive index layer 32 is omitted from these figures.

The retroreflection plate 2 in the present embodiment is a corner cube array including very minute shapes. Since it is difficult to produce such minute shapes with a high precision, the retroreflection plate 2 may be deviated from its ideal shape. In this case, if the rear substrate 12 is thick, as shown in FIG. 7(*a*), reflected light 701 which enters the display device from the viewer's side and is reflected from the retroreflection plate 2 may not return in its incident direction, but proceed in a slightly deviated direction and go out toward the viewer's side. Of it goes out through a pixel which is different from the pixel it traveled through when entering, the brightness of white displaying will be lowered.

On the other hand, when the rear substrate 12 is made thin, as shown in FIG. 7(*b*), even if reflected light 702 which has entered the display device and been reflected from the retroreflection plate 2 proceeds in a slightly deviated direction, there is an increased probability that it will go out through the same pixel as the pixel it traveled through when entering. As a result, the brightness of white displaying can be improved over comparative examples.

The thickness of the rear substrate 12 is preferably no less than 50 μm and no more than 300 μm, for example. If it is thinner than 50 μm, it may not be possible to ensure mechanical strength of the display device; if it exceeds 300 μm, sufficient white displaying characteristics may not be obtained due to deviations in the shape of the retroreflection plate 2. Note that, in the case of adopting a construction in which the rear substrate 12 is made thinner than the front substrate 10, a driving circuit (flexible substrate) may be mounted on the front substrate 10.

In the display devices of Embodiments 1 and 2, the retroreflection plate 2 is provided on the opposite side of the rear substrate 12 from the liquid crystal layer 1, i.e., on the outer side of the display panel. However, the retroreflection plate 2 may be disposed between the liquid crystal layer 1 and the rear substrate 12, i.e., inside the display panel.

Moreover, although the display devices of Embodiments 1 and 2 are both retroreflection liquid crystal display devices, the display device according to the present invention may be any display device which utilizes the scattering display mode, and it may be a reflection display device having a diffuse reflection plate instead of the retroreflection plate 2, or may be a transmission display device.

Although Embodiments 1 and 2 employ the liquid crystal layer 1 of scattering-type liquid crystal, the display device may be constructed by using other modulation layers which are capable of switching between a light scattering state and a light transmitting state.

Examples

Examples 1 to 3 of the display device according to the present invention were produced, and their displaying characteristics were measured; next, the method and results will be described. For comparison, Comparative Example was produced, which had no diffraction preventing layers, and similar measurements were taken.

The display device of Comparative Example is a retroreflection liquid crystal display device in which scattering-type liquid crystal is used, having the structure described with reference to FIGS. 2(*a*) and (*b*). In Comparative Example, glass substrates (thickness: 700 μm) were used as the front substrate 10 and the rear substrate 12. Moreover, polymer-dispersed type liquid crystal (refractive index in an ON state: about 1.5) was used as scattering-type liquid crystal, and a cubic corner cube array with a pitch of 10 μm was used as the retroreflection plate 2. The pixel electrodes 16 were formed by patterning an ITO film (thickness: 0.15 μm, refractive index: about 2.0) to a size of 60 μm×180 μm. The source lines 14 and the gate lines 15 were formed by using tantalum and tungsten, respectively. The intervals 22 between the source lines 14 and the pixel electrodes 16 and the intervals 23 between the gate lines 15 and the pixel electrodes 16 were both 3 μm. Note that polymer-dispersed type liquid crystal (refractive index: about 1.5) was present in the intervals 22 and 23.

The display device of Example 1 is a retroreflection liquid crystal display device as described in Embodiment 1 with reference to FIGS. 4(*a*) and (*b*). Example 1 has a similar construction to that of Comparative Example 1 except that the light absorbing layers 30 are formed between adjoining pixel electrodes 16. The light absorbing layers 30 in Example 1 were formed by, using spin coating technique, applying a black resin material to a thickness of 1 μm on the front face of the rear substrate 12 having the pixel electrodes 16, the wiring lines 14 and 15, and the like formed thereon, and performing a patterning by using photolithography. Constituent elements other than the light absorbing layers 30 were produced by a similar method by using a similar material to that of Comparative Example.

The display device of Example 2 has a similar construction to that of Example 1 except that the rear substrate 12 is thinner than the front substrate 10. As the rear substrate 12 in Example 2, a glass substrate with a 100 μm of thickness was used, which was obtained by performing etching for the rear face of a glass substrate (thickness: 700 μm) used in Example 1 and Comparative Example. Other than this etching step, a material and a method similar to those of Example 1 were used for production.

The display device of Example 3 is a retroreflection liquid crystal display device as described in Embodiment 2 with reference to FIG. 5. Example 3 is different from Comparative Example in that the high-refractive index layer 32 is formed between the rear substrate 12 and the liquid crystal layer 1 and that the rear substrate 12 is thinner than the front substrate 10. The high-refractive index layer 32 was formed by applying a transparent resin (application liquid for high-refractive index film formation TI-44 by RASA Industries, LTD.) on the front face of the rear substrate 12 having the pixel electrode 16, the wiring lines 14 and 15, and the like formed thereon, and then baking it at 40° C. The high-refractive index layer 32 had a thickness of 0.2 μm. With the high-refractive index layer 32, the intervals 22 and 23 between the pixel electrodes 16 and the wiring lines 14 and 15 are buried, and planarization was provided over the protrusions and depressions due to the pixel electrodes 16, the wiring lines 14 and 15, TFTs, and the like on the rear substrate 12. As the rear substrate 12, similarly to Example 2, a glass substrate with a thickness of 100 μm was used, which was obtained by etching the rear face of a glass substrate. Other than the formation of the high-refractive index layer 32 and the etching step for the glass substrate, a material and a method similar to those of Comparative Example were used for production.

Figure 8:
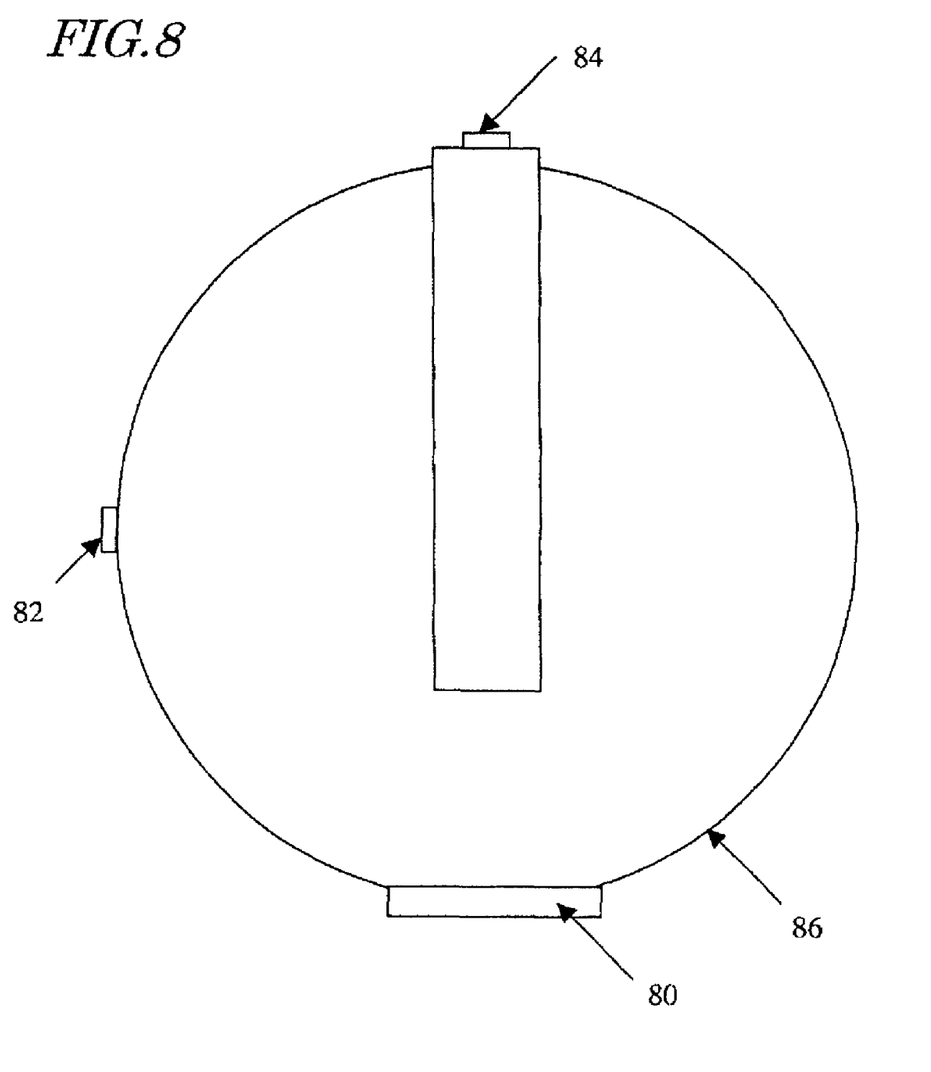
FIG. 8 A schematic illustration for explaining a measurement system to be used for reflectance measurement.

For the display devices of Comparative Example and Examples 1 to 3 thus obtained, reflectance measurements were taken with the following method, by using a measurement system (CM1000 by Minolta Corporation) shown in FIG. 8.

First, reflectance (brightness of white displaying) in a white displaying state was measured. The display device for measurement was installed as a sample element 80, and its liquid crystal layer 1 was placed in a scattering state. By using a light source 82 and an integrating sphere 86, light was allowed to be incident on the sample element 80 in all directions, and the intensity Iw of the light which was reflected in a direction perpendicular to the substrate of the sample element 80 was measured with a photodetector 84. The focusing angle of the photodetector 84 was 10 degrees. On the other hand, as a reference, a perfectly diffuse plate was installed on this measurement system instead of a display device, and within the light which was reflected by the perfectly diffuse reflection plate, the intensity Ir of the light heading in a direction perpendicular to the perfectly diffuse plate was measured with the photodetector 84. A ratio (Iw/Ir) (%) of the aforementioned light intensity Iw relative to the light intensity Ir when using the reference was calculated, and defined as a brightness of white displaying of the display device.

Next, reflectance (brightness of black displaying) in a black displaying state was measured. After switching the liquid crystal layer 1 of the sample element 80 into a transmitting state, light as allowed to be incident on the sample element 80 in all directions in a similar manner to the above, and the intensity Ib of the light being reflected in a direction perpendicular to the substrate of the sample element 80 was measured with the photodetector 84. A ratio (Ib/Ir) (%) of the intensity Ib thus obtained relative to the light intensity Ir when using the reference was calculated, and defined as a brightness of black displaying.

Furthermore, from the brightnesses of black displaying and white displaying obtained in the above manner, a displaying contrast ratio (brightness of white displaying/brightness of black displaying=Iw/Ib) was determined.

Measurement results of the brightnesses of white displaying and black displaying and the contrast ratio for the display devices of Comparative Example and Examples 1 to 3 are shown in Table 1.

TABLE 1

| | structure | brightness of white displaying Iw/Ir | brightness of black displaying Ib/Ir | contrast ratio Iw/Ib |
|---|---|---|---|---|
| Comparative Example | no diffraction preventing layers; thickness of rear substrate: 700 μm | 16.2% | 2.6% | 6.3 |
| Example 1 | light absorbing layers; thickness of rear substrate: 700 μm | 16.0% | 2.0% | 8.0 |
| Example 2 | light absorbing layers; thickness of rear substrate: 100 μm | 17.0% | 2.0% | 8.5 |
| Example 3 | high-refractive index layer; thickness of rear substrate: 100 μm | 17.5% | 2.1% | 8.2 |

The results given in Table 1 show that, in all of Examples 1 to 3, in which the diffraction preventing layer(s) according to the present invention was provided, the brightness of black displaying (reflectance) is lower than in Comparative Example, indicative of improved black displaying characteristics. It is presumable that, in Comparative Example, a portion of diffracted light occurring due to the light traveling through the intervals 22 between the pixel electrodes 16 and the wiring lines 14 on the rear substrate 12 and the light traveling through the pixel electrode 16 is received by the photodetector 84, whereas in Examples 1 to 3, occurrence of the aforementioned diffracted light is suppressed by the diffraction preventing layer(s) (the light absorbing layers 30 or the high-refractive index layer 32), so that the intensity of the light received by the photodetector 84 is reduced.

Moreover, although slightly, the brightness of Example 1 is decreased from that of Comparative Example. This is because the light absorbing layers 30 lower the efficiency of light utilization. However, since the black displaying characteristics are greatly improved over Comparative Example, ultimately speaking, the displaying contrast ratio is enhanced over Comparative Example.

In Example 2 and Example 3, the brightness of white displaying is improved over Comparative Example. This is because, as has been described with reference to FIGS. 7(a) and (b) the rear substrate 12 is made thinner than in Comparative Example, so that the reflected light from the retroreflection plate 2 is restrained from going out through a pixel which is different from the pixel through which it traveled when entering. Therefore, in Example 2 and Example 3, the black displaying characteristics and the white displaying characteristics can be greatly improved, whereby an excellent contrast ratio is obtained.

From these results, by paying attention to the diffraction prevention effect of the diffraction preventing layer(s) alone, it can be seen that the light absorbing layers 30 provide a higher effect and realize a higher-quality black displaying than does the high-refractive index layer 32. On the other hand, the high-refractive index Layer 32 has an advantage in that the black displaying characteristics can be improved based on the diffraction prevention effect, while ensuring the brightness of white displaying. Note that, regardless of which diffraction preventing layer(s) is employed in the display device, the brightness of white displaying can be improved over conventional retroreflection display devices by ensuring that the rear substrate 12 present between the retroreflection plate 2 and the liquid crystal layer 1 is thin.

Using the display devices of Comparative Example and Example 1, the transmission intensity of light in a black displaying state was measured, as will be described next. Note that the retroreflection plate 2 was detached from each display device in taking the measurements.

First, the method of measuring transmission intensity will be described. For the measurement, a measurement system shown in FIG. 9 (OTSUKA ELECTRONICS CO., LTD by LCD5200) was used. A display device for measurement was installed as a sample element 90, and light from a parallel light source 92 was allowed to enter from the rear face side, at an angle of 40 degrees with respect to a direction perpendicular to the substrate of the sample element 90. The liquid crystal layer 1 of the sample element 90 was placed in a transmitting state (black displaying state), and within the light entering the sample element 90 from the light source 92, the intensity It of light transmitted toward the viewer's side of the sample element 90 was measured with a photodetector 94. The measurements were taken while moving the photodetector 94 within a range of ±10 degrees (light receiving angle θ: 30 degrees to 50 degrees) with respect to the outgoing direction of the light source 92 (light receiving angle θ: 40 degrees). As shown, an light receiving angle θ refers to a light receiving angle with respect to the direction perpendicular to the substrate of the sample element 90.

Figure 9:
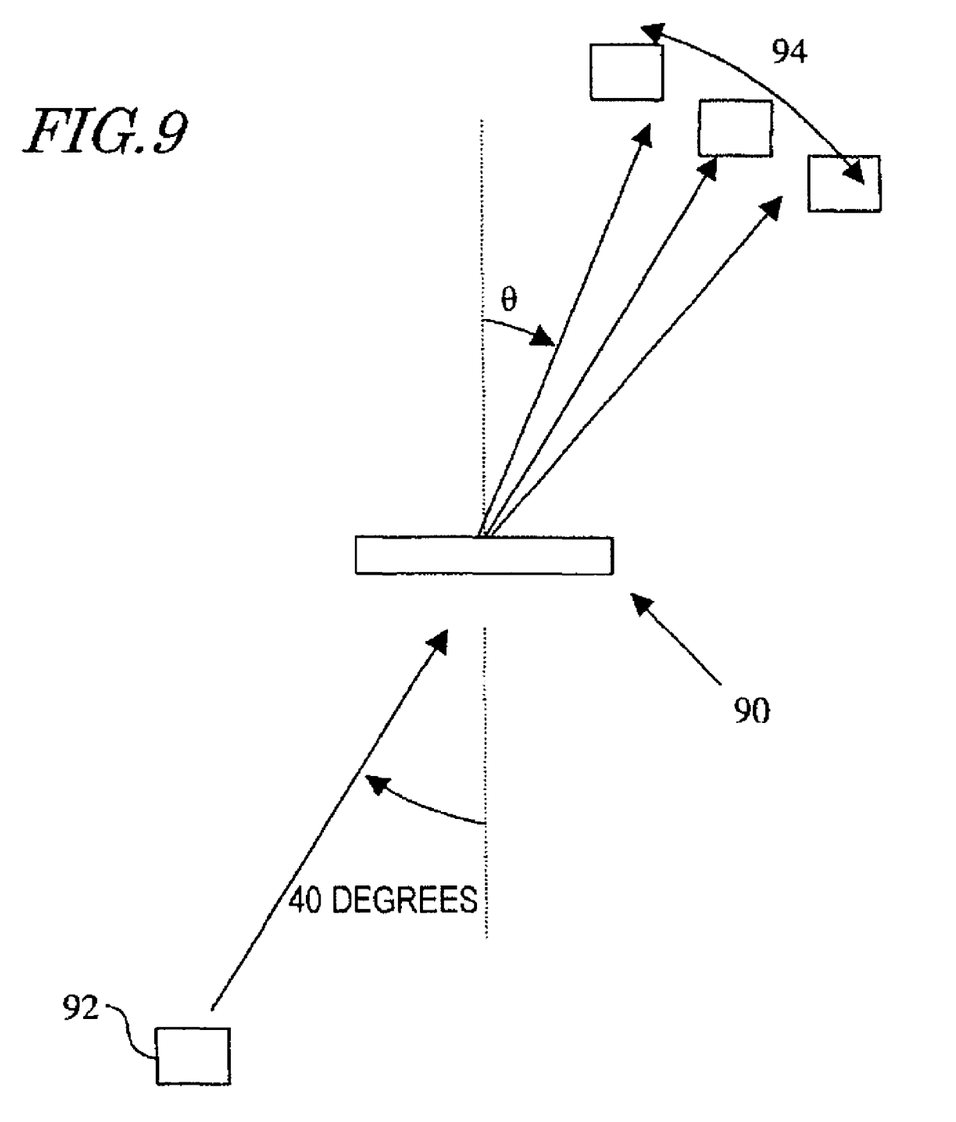
FIG. 9 A schematic illustration for explaining a measurement system to be used for transmission intensity measurement.

On the other hand, without installing the sample element 90, the intensity Ia of light from the light source 92 fixed at the aforementioned position was measured with the photodetector 94 being placed in an outgoing direction (light receiving angle θ: 40 degrees) of the light source 92. The resultant intensity (i.e., intensity of light transmitted through the "air") Ia was defined as 100%, and a transmission intensity T was calculated from the intensity It of light transmitted through the sample element 90 as measured by the above method (T=It/Ia(%)).

Figure 10:
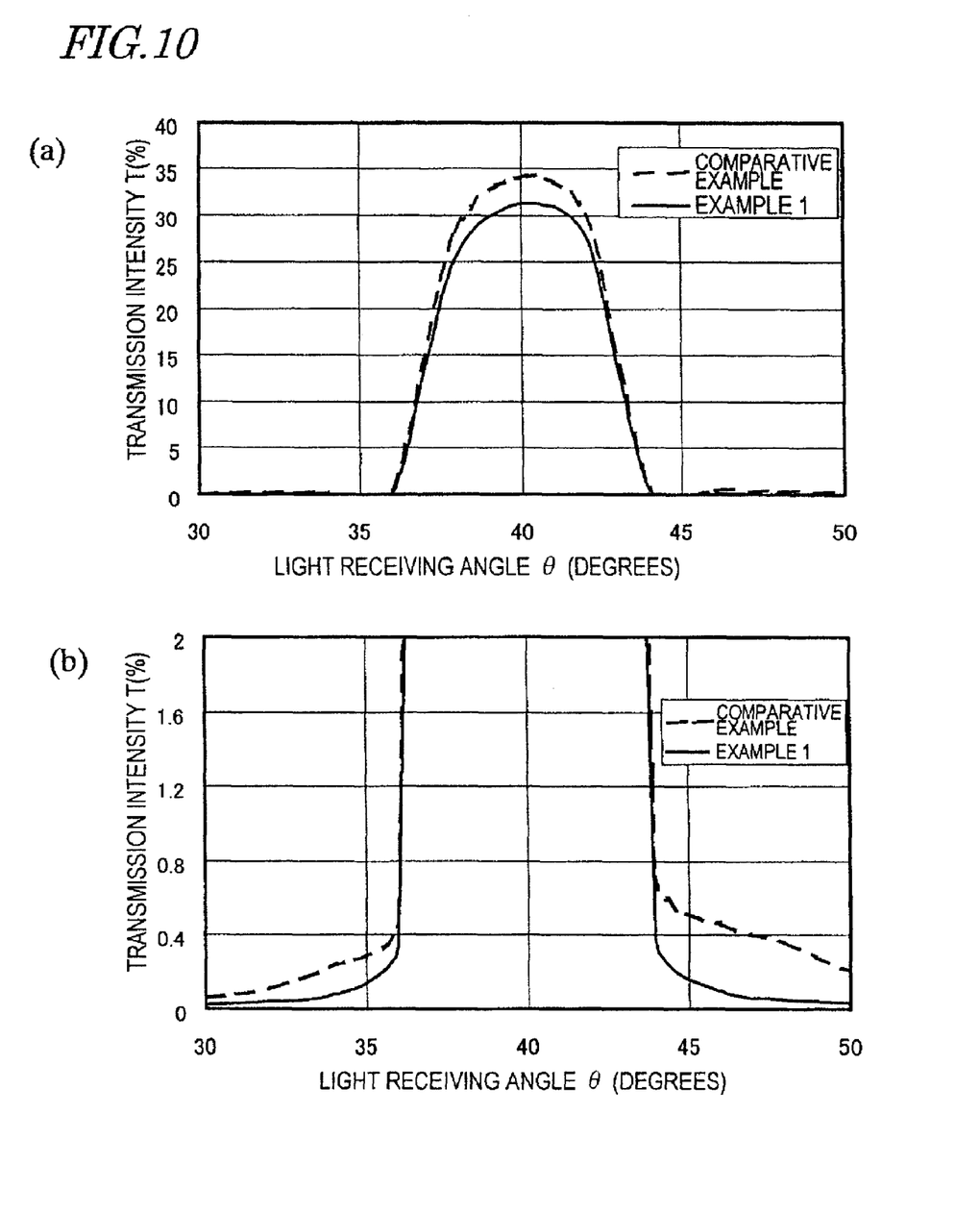

FIGS. 10(a) and (b) are graphs representing a relationship between the light receiving angle θ and the transmission intensity T with respect to the display devices of Comparative Example and Example 1. FIGS. 10(a) and (b) show the same results, although their vertical axes representing the transmission intensity T are of different scales.

First, the graph of FIG. 10(a) indicates that the transmission intensities of Comparative Example and Example 1 are maximum when the light receiving angle θ is 40 degrees, with the transmission intensity of Comparative Example being larger than the transmission intensity of Example 1. This is presumably because, in Example 1, the aperture ratio is lowered by the light absorbing layers 30 provided on the rear substrate 12.

Moreover, the graph of FIG. 10(b) indicates that, when the light receiving angle θ is 30 to 36 degrees or 44 to 50 degrees, the transmission intensity of Example 1 is decreased to be smaller than the transmission intensity of Comparative Example, the decrease being sufficiently larger than the aforementioned decrease due to the lowered aperture ratio. It is presumable that, in Comparative Example, a portion of diffracted light is received by the photodetector 94 and therefore the transmission intensity at the light receiving angle θ increases, whereas in Example 1, such diffracted light does not occur and therefore the increase in transmission intensity at the aforementioned light receiving angle θ is suppressed.

From these results, the diffraction prevention effect due to the light absorbing layers 30 was confirmed. Note that a diffraction prevention effect due to the high-refractive index layer 32 can also be confirmed by a similar method.

Industrial Applicability

According to the present invention, occurrence of diffracted light in a display device which utilizes the scattering display mode can be suppressed. Thus, the displaying contrast can be improved while minimizing deteriorations in the displaying characteristics due to diffracted light.

The present invention is suitably used for a transmission or reflection liquid crystal display device in which polymer-dispersed type liquid crystal is used. Among these, in a retroreflection liquid crystal display device having a retroreflection plate, the influence which diffracted light exerts on displaying characteristics is significant. Therefore, applying the present invention to such a display device would be advantageous because it can more effectively improve the displaying characteristics.

The invention claimed is:

1. A display device comprising:
a pair of substrates placed so as oppose each other;
a plurality of pixel electrodes formed on one of the pair of substrates;
a counter electrode formed on the other of the pair of substrates;
a modulation layer provided between the plurality of pixel electrodes and the counter electrode, the modulation layer being capable of switching states between a transmitting state in which light is transmitted and a scattering state in which light is scattered,
a plurality of switching elements formed on the one substrate and electrically connected respectively to corresponding pixel electrodes;
a plurality of wiring lines disposed on the one substrate and at intervals from the plurality of pixel electrodes; and
a diffraction preventing layer, for reducing diffraction, disposed in the intervals between the wiring lines and the pixel electrodes, wherein the diffraction preventing layer comprises a photosensitive resin that is patternable via photolithography.

2. The display device of claim 1, wherein the diffraction preventing layer absorbs light entering the interval.

3. A display device comprising:
a pair of substrates placed so as oppose each other;
a plurality of pixel electrodes formed on one of the pair of substrates;
a counter electrode formed on the other of the pair of substrates;
a modulation layer provided between the plurality of pixel electrodes and the counter electrode, the modulation layer being capable of switching states between a transmitting state in which light is transmitted and a scattering state in which light is scattered;
a plurality of switching elements formed on the one substrate and electrically connected respectively to corresponding pixel electrodes;
a plurality of wiring lines disposed on the one substrate and at intervals from the plurality of pixel electrodes;
a diffraction preventing layer, for reducing diffraction, disposed in the intervals between the wiring lines and the pixel electrodes and over entire upper surfaces of the plurality of pixel electrodes; and
wherein the diffraction preventing layer is composed of a material having a refractive index within ±10% of a refractive index of a material of the pixel electrodes.

4. The display device of claim 3, wherein the diffraction preventing layer is composed of a material having a refractive index of no less than 1.8 and no more than 2.2.

5. The display device of claim 1, wherein the display device further comprises a reflective layer disposed on an opposite side of the one substrate from the modulation layer.

6. The display device of claim 5, wherein the reflective layer has retroreflection characteristics.

7. The display device of claim 5, wherein the one substrate has a thickness which is smaller than a thickness of the other substrate.

8. The display device of claim 3, further comprising a reflective layer on an opposite side of the one substrate from the modulation layer.

9. The display device of claim 8, wherein the reflective layer has retroreflection characteristics.

10. The display device of claim 8, wherein the one substrate has a thickness which is smaller than a thickness of the other substrate.

* * * * *